United States Patent
Yoshida et al.

(10) Patent No.: US 8,351,553 B2
(45) Date of Patent: Jan. 8, 2013

(54) MIMO RECEIVING APPARATUS AND RECEIVING METHOD

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 12/297,125

(22) PCT Filed: Feb. 2, 2007

(86) PCT No.: PCT/JP2007/051754
§ 371 (c)(1),
(2), (4) Date: Oct. 14, 2008

(87) PCT Pub. No.: WO2007/119280
PCT Pub. Date: Oct. 25, 2007

(65) Prior Publication Data
US 2009/0262853 A1  Oct. 22, 2009

(30) Foreign Application Priority Data

Apr. 13, 2006  (JP) .................... 2006-110871

(51) Int. Cl.
*H04L 1/02* (2006.01)
*H04B 7/04* (2006.01)
(52) U.S. Cl. .................... 375/347; 375/267
(58) Field of Classification Search .............. 375/267, 375/340, 347; 370/210; 455/562.1
See application file for complete search history.

(56) References Cited

U.S. PATENT DOCUMENTS

| | | | |
|---|---|---|---|
| 2003/0189999 A1* | 10/2003 | Kadous | 375/347 |
| 2004/0165675 A1* | 8/2004 | Ito et al. | 375/267 |
| 2008/0219341 A1* | 9/2008 | Kim | 375/232 |

FOREIGN PATENT DOCUMENTS

| | | |
|---|---|---|
| JP | 2003-348045 | 12/2003 |
| JP | 2004-235916 | 8/2004 |
| JP | 2005-269383 | 9/2005 |
| JP | 2005-328311 | 11/2005 |

OTHER PUBLICATIONS

Xu Zhu Murch, R.D.; Layered space-frequency equalization in a single-carrier MIMO system for frequency-selective channels, Wireless Communications, IEEE Transactions on , vol. 3, Issue: 3, May 2004, pp. 701-708.

Peng Du Guangguo Bi Qiang Li, Single carrier frequency domain equalization for high data rate transmission systems over frequency selective fading channels, Emerging Technologies: Frontiers of Mobile and Wireless Communications, 2004. Proceedings of the IEEE 6th Circuits and Systems Symposium on, vol. 2, Jun. 2, 2004, pp. 361-364.

\* cited by examiner

*Primary Examiner* — Betsy Deppe
(74) *Attorney, Agent, or Firm* — Young & Thompson

(57) ABSTRACT

In a MIMO receiving apparatus, the signals of single carriers transmitted from a plurality of transmission antennas are received by a plurality of reception antennas (1-1 through 1-N) and then separated according to frequency ranges. In this MIMO receiving apparatus, interference replicas of the antennas are eliminated from the received signals (by subtractor 54) before equalizing the two-dimensional frequency ranges, and non-distortion signal replicas are added (by a demodulating part 55) to the signals from which the interference replicas of the antennas have been eliminated after equalizing the two-dimensional frequency ranges.

6 Claims, 9 Drawing Sheets

MIMO RECEIVING APPARATUS AND RECEIVING METHOD

TECHNICAL FIELD

The present invention relates to a MIMO receiving apparatus and receiving method for making multiple-input multiple-output (MIMO) radio communications using radio technologies, and more particularly, to a MIMO receiving apparatus and receiving method which converts single-carrier MIMO signals to signals in a frequency domain, and which separates the MIMO signals through processing in the frequency domain.

BACKGROUND ART

High-speed data transmissions are required for radio systems of the next-generation mobile communication. As a technology for realizing this high-speed data transmission, MIMO (Multiple Input Multiple Output) multiplexing has drawn attention, where data signals are transmitted from a plurality of transmission antennas using the same frequency, and where the data signals are demodulated using a plurality of reception antennas.

FIG. 1 is a diagram showing an exemplary configuration of a conventional MIMO transmission/reception system which employs MIMO multiplexing.

The MIMO transmission/reception system shown in FIG. 1 comprises transmitting apparatus 201 and transmission antennas 202-1-202-M on the transmission side, and reception antennas 203-1-203-N and receiving apparatus 204 on the reception side, where M is the number of transmission antennas (M is an integer equal to or larger than two), and N is the number of reception antennas (N is an integer equal to or larger than two). Different data signals are transmitted from a plurality of transmission antennas 202-1-202-M using the same frequency, and the data signals are received using a plurality of reception antennas 203-1-203-N, whereby a high-speed data transmission is achieved in proportion to the number of transmission antennas without increasing the transmission bandwidth. In receiving apparatus 204, the respective data signals transmitted from a plurality of transmission antennas 202-1-202-M must be demodulated (separated) from the signals received at a plurality of reception antennas 203-1-203-N.

While a variety of schemes have been proposed for the signal separation of MIMO, the simplest scheme, for example involves restraining interference from transmission antennas other than the transmission antenna subjected to demodulation, using a linear filter based on minimum mean square error (MMSE). However, the reception characteristics cannot be said to be good when this scheme is used. To improve the reception characteristics using this scheme, a scheme has been proposed for combining an MMSE filter with transmission antenna interference removal.

Also, a maximum likelihood detection (MLD) has been devised for generating replicas of all transmission antenna signals and selecting the most likely transmission antenna signal. This detection method, though exhibiting good reception characteristics, causes an exponential increase in processing amount in accordance with an increase in the number of transmission antennas and the modulation multiple-value.

On the other hand, in an uplink radio scheme of the next-generation mobile communication, a terminal must realize a high transmission power efficiency in order to expand a communication area, and a single-carrier (SC) scheme having a low peak to average power ratio (PAPR) is regarded as predominant. Also, when MIMO multiplexing is performed in the SC scheme, multipath interference constitutes a problem. Also, when an MMSE filter is used to separate signals of MIMO, an MMSE filter (two-dimensional MMSE filter) is required to simultaneously separate the MIMO signals and to restrain the multipath interference, i.e., in a spatial direction and a time direction. Then, a scheme which combines the two-dimensional MMSE filter with transmission antenna interference removal excels in characteristics, and is regarded as predominant.

FIG. 2 is a diagram showing an exemplary configuration of a conventional MIMO receiving apparatus.

In the MIMO receiving apparatus shown in FIG. 2, an increase in the processing amount is limited by equalizing two-dimensional MMSE and by removing transmission antenna interference through signal processing in a frequency domain. Also, a method of improving the characteristics by repeating the two-dimensional frequency domain equalization and reception processing of antenna interference removal has been devised (for example, see the article "Throughput Characteristic of SC-MIMO Multiplexing using Two-Dimensional MMSE weighting in Frequency Domain Repeating PIC," Akinori Nakajima, Humiyuki Adachi, IEICE Technical Report, RCS2005-88, pp. 19-24, October 2005).

The MIMO receiving apparatus shown in FIG. 2 is a MIMO receiving apparatus which receives single-carrier MIMO signals, transmitted from M transmission antennas (M is an integer equal to or larger than two), at N reception antennas (N is an integer equal to or larger than two), and which separates the MIMO signals through processing in a frequency domain. This MIMO receiving apparatus comprises reception antennas 101-1-101-N, cyclic prefix (CP) removing parts 102-1-102-N, discrete Fourier transform (DFT) parts 103-1-103-N, reception filters 104-1-104-N, subtracting part 105, channel estimator 106, weight calculating part 107, two-dimensional frequency domain equalizer 108, inverse discrete Fourier transform (IDFT) parts 109-1-109-M, bit likelihood calculating parts 110-1-110-M, symbol replica generators 111-1-111-M, DFT parts 112-1-112-M, and antenna interference replica generators 113-1-113-M.

FIG. 3 is a diagram showing an exemplary radio frame format when frequency domain equalization is used.

The frame shown in FIG. 3 shows a radio frame signal transmitted from a certain transmission antenna. The radio frame signal comprises a plurality of blocks of pilot signals or data signals, and in the example shown in FIG. 3, there is a pilot signal block at the top, followed by a plurality of data blocks in sequence. CP is added to the top of each block in order to avoid multipath interference from the preceding block in the event of DFT processing. The CP is a signal generated by copying the last data in each block to the forefront. In MIMO, it is necessary to estimate a channel gain between a transmission antenna and a reception antenna, so that the pilot signals of respective transmission antennas are preferably orthogonal to one another. As a method of multiplexing pilot signals of the respective transmission antennas, frequency multiplexing using an IFDM (Interleaved Frequency Division Multiplexing), code multiplexing using a cyclically shifted CAZAC (Constant Amplitude Zero Auto-Correlation) code have been devised.

Also, reception antenna 101-1-101-N shown in FIG. 2 receives a single-carrier MIMO signal. CP removing part 102-1-102-N receives each reception antenna signal, and removes part of the signal corresponding to the CP at a common timing. DFT part 103-1-103-N receives each reception antenna signal, from which the CP has been removed, and performs DFT at point:

$$N_{DFT1} (N_{DFT1} \text{ is an integer equal to or larger than two}) \qquad [\text{Expression 1}]$$

to convert the reception signal to the frequency domain. Reception filter 104-1-104-N filters the reception signal in the frequency domain, and performs waveform shaping, noise suppression, user separation, and the like. Generally, raised cosine roll-off filters are used for reception filters 104-1-104-N. In the configuration shown in FIG. 2, reception filters 104-1-104-N perform signal processing in the frequency domain, but alternatively can perform signal processing in a time domain prior to DFT parts 103-1-103-N. Subtracting part 105 subtracts other transmission antenna interference replica while leaving a transmission antenna signal subjected to demodulation.

FIG. 4 is a diagram showing an exemplary configuration of subtracting part 105 for a DFT signal of reception antenna n.

Subtracting part 105 shown in FIG. 4 comprises replica combining parts 121-1-121-M, and subtractors 122-1-122-M. Replica combining parts 121-1-121-M combine transmission antenna interference replicas except for a transmission antenna signal subjected to demodulation. Subtractors 122-1-122-M subtract outputs of replica combining parts 121-1-121-M from the DFT signal of reception antenna n.

Assuming that reception signals at sub-carriers $k(1 \leq k \leq N_{DFT1})$ [Expression 2]

after DFT are given by:

$R(k)$ ($R(k)$ is an $N$-row column vector) [Expression 3]

and i-th repetition interference replica of transmission antenna m is given by:

$\hat{I}_m^{(i)}(k)$ ($\hat{I}_m^{(i)}(k)$ is an $N$-row column vector), [Expression 4]

an equalizing signal for transmission antenna m after removal of the i-th repetition interference:

$R_m^{(i)}(k)$ ($R_m^{(i)}(k)$ is an $N$-row column vector), [Expression 5]

is given by the following equation:

[Expression 6]

$$R_m^{(i)}(k) = R(k) - \sum_{\substack{m'=1 \\ m' \neq m}}^{M} \hat{I}_{m'}^{(i)}(k) \quad \text{(Equation 1)}$$

Here, interference removal is not performed in the first reception processing (zero-th repetition), and a reception signal is used as it is. Specifically,

[Expression 7]

$R_m^{(0)}(k) = R(k)$ (Equation 2)

is established.

Channel estimating part 106 estimates a channel gain between a transmission antenna and a reception antenna in the frequency domain using a pilot signal inserted into each transmission antenna.

FIG. 5 is a diagram showing an exemplary configuration of channel estimating part 106 for finding a channel gain for transmission antenna m in reception antenna n.

Channel estimating part 106 shown in FIG. 5 comprises DFT part 131, transmission/reception filter 132, reference signal generator 133, correlation processing part 134, and noise suppressing part 135. DFT part 131 discrete Fourier transforms a pilot code of transmission antenna m for conversion to a frequency domain signal. Transmission/reception filter 132 passes the frequency domain signal of the pilot code through the transmission/reception filter 132. Reference signal generator 133 calculates a pilot reference signal, using the output of a transmission/reception filter 132, for use in correlation processing with a reception pilot signal. Correlation processing part 134 estimates a channel gain through correlation processing of the pilot reception signal in the frequency domain and the pilot reference signal. Noise suppressing part 135 suppresses noise of the channel gain estimated by correlation processing part 134 to improve the signal power-to-noise power ratio (S/N ratio) of a channel estimate which is the estimated channel gain. A method of averaging adjacent sub-carriers, a method of once converting a channel estimate to the time domain through IDFT and returning the same again to the frequency domain through DFT after removing a noise path, and the like have been contemplated for noise suppressing part 135. Channel estimating part 106 having the configuration shown in FIG. 5 performs signal processing in the frequency domain, but can also perform signal processing in advance in the time domain prior to DFT parts 103-1-103-N.

Weight calculating part 107 calculates a weight for two-dimensional frequency domain equalization using the channel estimate between the transmission antenna and the reception antenna. Generally, an MMSE algorithm is used for weight calculating part 107. An i-th repetition MMSE weight for transmission antenna m:

$W_m^{(i)}(k)$ ($W_m^{(i)}(k)$ is an $N$-column row vector) [Expression 8]

is calculated using a channel estimate matrix:

$\hat{H}(k)$ ($\hat{H}(k)$ is an $N$-row, $M$-column matrix) [Expression 9]

and noise power:

$\sigma^2$ [Equation 10]

by the following equation:

[Expression 11]

$W_m^{(i)}(k) = \hat{H}_m^H(k)[\hat{H}(k)G_m^{(i)}\hat{H}^H(k)+\sigma^2 I]^{-1}$ (Equation 3)

where

[Expression 12]

$\hat{H}(k) = [\hat{H}_1(k), \ldots, \hat{H}_m(k), \ldots, \hat{H}_M(k)]$ (Equation 4)

Also, $\hat{H}_m(k)$ ($\hat{H}_m(k)$ is an $N$-row column vector) [Expression 13]

is a channel estimate between transmission antenna m and the reception antenna.

$G_m^{(i)}$ [Equation 14]

is an i-th repetition interference removal consideration matrix of transmission antenna m, and is given by the following equation:

[Expression 15]

$G_m^{(i)} = \text{diag}[g_{m,1}^{(i)}, \ldots, g_{m,m}^{(i)}, \ldots, g_{m,M}^{(i)}]$ (Equation 5)

Here, $g_{m,m'}^{(i)}$ [Expression 16]

is calculated using, for example, the average power of an i-th repetition soft decision symbol replica in the time domain of transmission antenna m:

$\hat{d}_m^{(i)}(t)$ [Equation 17]

by the following equation:

[Expression 18]

$$g_{m,m'}^{(i)} = \begin{cases} 1 - \frac{1}{N_{SYMB}} \sum_{t=1}^{N_{SYMB}} \left|\hat{d}_{m'}^{(i-1)}(t)\right|^2 & (m' \neq m) \\ 1 & (m' = m) \end{cases} \quad \text{(Equation 6)}$$

Here, $$N_{SYMB} \quad \text{[Expression 19]}$$

is the number of symbols in a data block.

Two-dimensional frequency domain equalizing part 108 receives the two-dimensional equalization weight calculated in weight calculating part 107 and the output of subtracting part 105, and multiplies them on a sub-carrier by sub-carrier basis to simultaneously separate MIMO signals and suppress multipath interference in the frequency domain. Assuming that the weight calculated in weight calculating part 107 is given by:

$$W_m^{(i)}(k) \quad \text{[Expression 20]}$$

and the output of subtracting part 105 is given by:

$$R_m^{(i)}(k) \quad \text{[Expression 21]}$$

an equalization signal of transmission antenna m two-dimensionally equalized in two-dimensional frequency domain equalizing part 108:

$$\tilde{R}_m^{(i)}(k) \quad \text{[Expression 22]}$$

is given by the following equation:

[Expression 23]

$$\tilde{R}_m^{(i)}(k) = W_m^{(i)}(k) R_m^{(i)}(k) \quad \text{(Equation 7)}$$

IDFT part 109-1-109-M which receives an equalization signal of each transmission antenna which is the output of two-dimensional frequency domain equalizing part 108, performs IDFT at point:

$$N_{IDFT}(N_{IDFT} \text{ is an integer equal to or larger than two}) \quad \text{[Expression 24]}$$

to convert the equalization signal to the time domain. Outputs of an i-th repetition (i≧1) of IDFT parts 109-1-109-M constitute a final demodulated signal.

Bit likelihood calculating part 110-1-110-M calculates a likelihood for each bit transmitted from the equalization signal of each transmission antenna. Bit likelihood calculating parts 110-1-110-M also include hard decision of bits.

Symbol replica generating part 111-1-111-M generates a symbol replica of transmission antenna m from the likelihood of a bit transmitted from each transmission antenna. Used in symbol replica generating parts 111-1-111-M are a method of generating a hard decision symbol replica, a method of generating a hard decision symbol replica and multiplying it by a predetermined replica weighting coefficient (constant equal to or less than one), a method of generating a soft decision symbol replica, and the like. In particular, the method of generating a soft decision symbol replica exhibits good characteristics.

DFT part 112-1-112-M receives a symbol replica of each transmission antenna generated in symbol replica generating part 111-1-111-M, and performs DFT at point:

$$N_{DFT2}(N_{DFT2} \text{ is an integer equal to or larger than two}) \quad \text{[Expression 25]}$$

to convert the symbol replica to the frequency domain.

Antenna interference replica generating part 113-1-113-M generates a transmission antenna interference replica using a symbol replica signal in the frequency domain of each transmission antenna and a channel estimate. Assuming that a symbol replica signal in the frequency domain of transmission antenna m is given by:

$$\hat{D}_m^{(i)}(k) \quad \text{[Expression 26]}$$

and the channel estimate is given by:

$$\hat{H}_m(k) \quad \text{[Expression 27]}$$

an i-th repetition interference replica of transmission antenna m:

$$\hat{I}_m^{(i)}(k) \quad \text{[Expression 28]}$$

is given by the following equation:

[Expression 29]

$$\hat{I}_m^{(i)}(k) = \hat{H}_m(k) \hat{D}_m^{(i-1)}(k) \quad \text{(Equation 8)}$$

As described above, the conventional MIMO receiving apparatus is characterized in that the processing amount is largely reduced as compared with signal processing in the time domain, and it is not affected by a timing error when the two-dimensional frequency domain equalization and antenna interference removal in the frequency domain, including the channel estimation, are performed.

However, the conventional MIMO receiving apparatus has problems in that repetitive reception processing for two-dimensional frequency domain equalization and antenna interference removal still continues linear processing in the time direction, a weight after convergence of the two-dimensional frequency domain equalization is an MMSE weight for a transmission antenna signal subjected to demodulation, and noise emphasis due to the equalization remains even if repetitions are made. Accordingly, the conventional MIMO receiving apparatus is inferior to the reception characteristics of MLD which has excellent characteristics.

DISCLOSURE OF THE INVENTION

In order to solve the problems as described above, it is an object of the present invention to provide a MIMO receiving apparatus and receiving method which are capable of realizing excellent MIMO reception characteristics because of the ability to reduce the amount of processing for calculating weights in the removal of antenna interference and the equalization of two-dimensional frequency domain and the ability to eliminate not only other antenna interference but also multipath interference of a transmission antenna subjected to demodulation, provided by employing a configuration for removing all antenna interference replicas before two-dimensional frequency domain equalization and for adding a distortion-free signal replica to each transmission antenna after two-dimensional frequency domain equalization in a MIMO receiving apparatus for converting single-carrier MIMO signals to signals in a frequency domain and separating the MIMO signals through processing in the frequency domain.

To achieve the above object, the present invention provides a MIMO receiving apparatus for receiving single-carrier signals transmitted from a plurality of transmission antennas provided on a transmitting apparatus at a plurality of reception antennas and for separating the signals by a frequency domain. The MIMO receiving apparatus comprises:

a DFT part for discrete Fourier transforming the signals received at the reception antennas at a first point;

a channel estimating part for estimating a channel gain between the transmission antenna and the reception antenna using a pilot signal inserted into a signal transmitted from the transmission antenna;

a replica reproducing part for performing two-dimensional frequency domain equalization based on a weight calculated using the channel gain, and generating an interference replica and a distortion-free signal replica of each transmission antenna;

a subtracting part for removing the interference replicas of all the transmission antennas from the signals discrete Fourier transformed in the DFT part; and a demodulating part for performing two-dimensional frequency domain equalization with a weight calculated on the basis of the interference removal by the subtracting part using the channel gain for the signals from which the interference replicas have been eliminated, and for adding the distortion-free signal replicas to the equalized signal to demodulate the signals transmitted from the transmission antennas.

Also, the MIMO receiving apparatus is characterized by further comprising a plurality of subtracting parts and a plurality of replica reproducing parts after the replica reproducing part, for repeatedly performing antenna interference removal and replica reproduction processing.

The MIMO receiving apparatus is also characterized by simultaneously demodulating transmission antenna signals to eliminate antenna interference in parallel.

The MIMO receiving apparatus is also characterized by ordering transmission antenna signals based on a reception quality, demodulating the transmission antenna signals with higher qualities, and sequentially removing the antenna interference.

The MIMO receiving apparatus is also characterized in that the replica reproducing part comprises:

a weight calculating part for calculating a weight for two-dimensional frequency domain equalization using a channel estimate between the transmission antenna and the reception antenna;

a two-dimensional frequency domain equalizing part applied with the weight and a signal output from the subtracting part to multiply the same on a sub-carrier by sub-carrier basis to perform and output MIMO signal separation and multipath interference suppression in a frequency domain;

an IDFT part for discrete inverse Fourier transforming a demodulated signal of each transmission antenna which is a signal output from the two-dimensional frequency domain equalizing part at a second point;

a bit likelihood calculating part for calculating a bit likelihood for each transmitted bit based on the demodulated signal of each transmission antenna;

a symbol replica generating part for generating a symbol replica based on the bit likelihood;

a DFT part for discrete Fourier transforming the symbol replica at a third point;

an antenna interference replica generating part for generating a transmission antenna interference replica using a symbol replica signal in the frequency domain and a channel estimate; and a distortion-free signal replica generating part for generating a distortion-free signal replica using the symbol replica signal in the frequency domain and a sub-carrier average value of the channel gain after two-dimensional frequency domain equalization.

The MIMO receiving apparatus is also characterized in that the demodulating part comprises:

a weight calculating part for calculating a weight for two-dimensional frequency domain equalization using a channel estimation value between the transmission antenna and the reception antenna based on interference removal by the subtracting part;

a two-dimensional frequency domain equalizing part applied with the weight and a signal output from the subtracting part to multiply the same on a sub-carrier by sub-carrier basis to perform and output MIMO signal separation and multipath interference suppression in a frequency domain;

an adding part for adding and outputting a distortion-free signal replica to a signal output from the two-dimensional frequency domain equalizing part; and an IDFT part for discrete inverse Fourier transforming a demodulated signal of each transmission antenna which is a signal output from the adding part at a second point.

The MIMO receiving apparatus is also characterized in that the plurality of replica reproducing parts provided after the replica reproducing part comprises:

a weight calculating part for calculating a weight for two-dimensional frequency domain equalization using a channel estimation value between the transmission antenna and the reception antenna based on interference removal by the subtracting part;

a two-dimensional frequency domain equalizing part applied with the weight and a signal output from the subtracting part to multiply the same on a sub-carrier by sub-carrier basis to perform and output MIMO signal separation and multipath interference suppression in a frequency domain;

an adding part for adding and outputting a distortion-free signal replica to a signal output from the two-dimensional frequency domain equalizing part; and an IDFT part for discrete inverse Fourier transforming a demodulated signal of each transmission antenna which is a signal output from the adding part at a second point;

a bit likelihood calculating part for calculating a bit likelihood for each transmitted bit based on the demodulated signal of each transmission antenna;

a symbol replica generating part for generating a symbol replica based on the bit likelihood;

a DFT part for discrete Fourier transforming the symbol replica at a third point;

an antenna interference replica generating part for generating a transmission antenna interference replica using a symbol replica signal in the frequency domain and a channel estimate; and a distortion-free signal replica generating part for generating a distortion-free signal replica using the symbol replica signal in the frequency domain and a sub-carrier average value of the channel gain after two-dimensional frequency domain equalization.

The MIMO receiving apparatus is also characterized in that the replica reproducing part further comprises a decoding part after the bit likelihood calculating part, and generates a symbol replica using error correction decoded bits.

The MIMO receiving apparatus is also characterized in that the plurality of replica reproducing parts provided after the replica reproducing part further comprise a decoding part after the bit likelihood calculating part, and generate a symbol replica using error correction decoded bits.

The present invention also provides a MIMO receiving method for receiving single-carrier signals transmitted from a plurality of transmission antennas at a plurality of reception antennas and for separating the signals through processing in a frequency domain. The MIMO receiving method comprises:

processing for discrete Fourier transforming the signals received at the reception antennas at a first point;

processing for estimating a channel gain between the transmission antenna and the reception antenna using a pilot signal inserted into a signal transmitted from the transmission antenna;

processing for performing two-dimensional frequency domain equalization based on a weight calculated using the channel gain, and for generating an interference replica and a distortion-free signal replica of each transmission antenna;

processing for removing the interference replicas of all the transmission antennas from the signals that have been discrete Fourier transformed;

processing for performing two-dimensional frequency domain equalization with a weight calculated on the basis of interference removal by the subtracting part using the channel gain for the signals from which the interference replicas have been eliminated; and processing for adding the distortion-free signal replicas to the equalized signal to demodulate the signals transmitted from the transmission antennas.

In the present invention configured as described above, in the MIMO receiving apparatus in which single-carrier signals transmitted from a plurality of transmission antennas are received at a plurality of reception antennas, and in which the signals are separated by a frequency domain, interference replica of the antennas is eliminated from the received signals before two-dimensional frequency domain equalization is performed, and distortion-free signal replicas are added to the signals from which interference replicas of the antennas have been eliminated, after two dimensional frequency domain equalization was performed.

Accordingly, it is possible to reduce the amount of processing for weight calculation for antenna interference removal and two-dimensional frequency domain equalization, and to eliminate not only interference caused by other antennas but also multipath interference of a transmission antenna subjected to demodulation.

As described above, in the MIMO receiving apparatus in which single-carrier signals transmitted from a plurality of transmission antennas are received at a plurality of reception antennas, and in which the signals are separated by a frequency domain, the present invention is configured to eliminate interference replica of the antennas from the received signals before the two-dimensional frequency domain equalization is performed, and to add distortion-free signal replicas to the signals from which 15 the interference replicas of the antennas have been eliminated, after two dimensional frequency domain equalization was performed, so that the present invention can realize excellent MIMO reception characteristics.

A diagram showing an exemplary configuration of a conventional MIMO transmission/reception system which employs MIMO multiplexing.

FIG. 2

A diagram showing an exemplary configuration of a conventional MIMO receiving apparatus.

FIG. 3

A diagram showing an example of a radio frame format when frequency domain equalization is employed.

FIG. 4

A diagram showing an exemplary configuration of a subtracting part for a DFT signal of reception antenna n.

FIG. 5

A diagram showing an exemplary configuration of a channel estimating part for calculating a channel gain of transmission antenna m in reception antenna n.

FIG. 6

A diagram showing a first embodiment of a MIMO receiving apparatus of the present invention.

FIG. 7

A diagram showing a second embodiment of a MIMO receiving apparatus of the present invention.

FIG. 8

Figure 1:
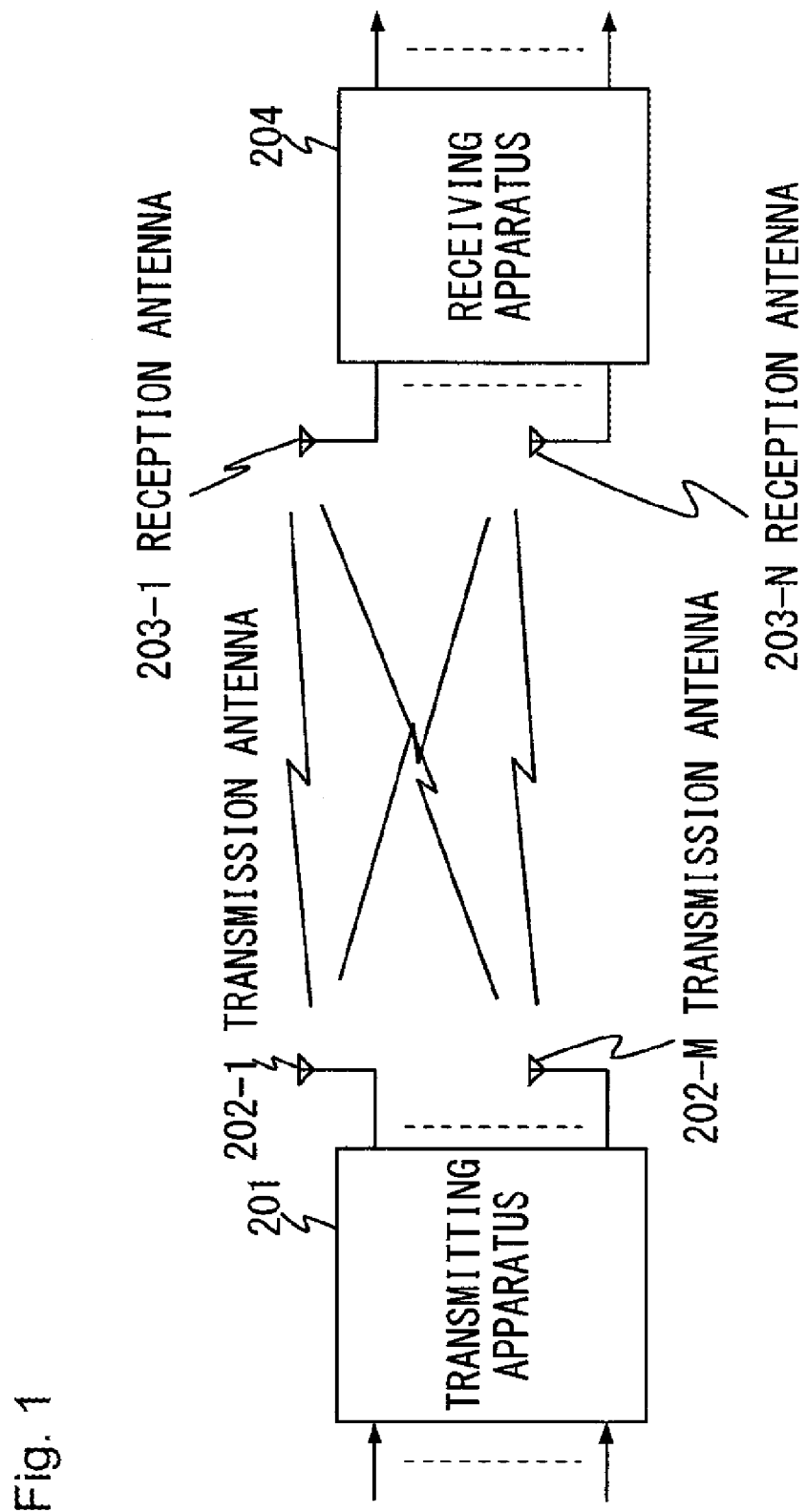
FIG. 1
Figure 2:
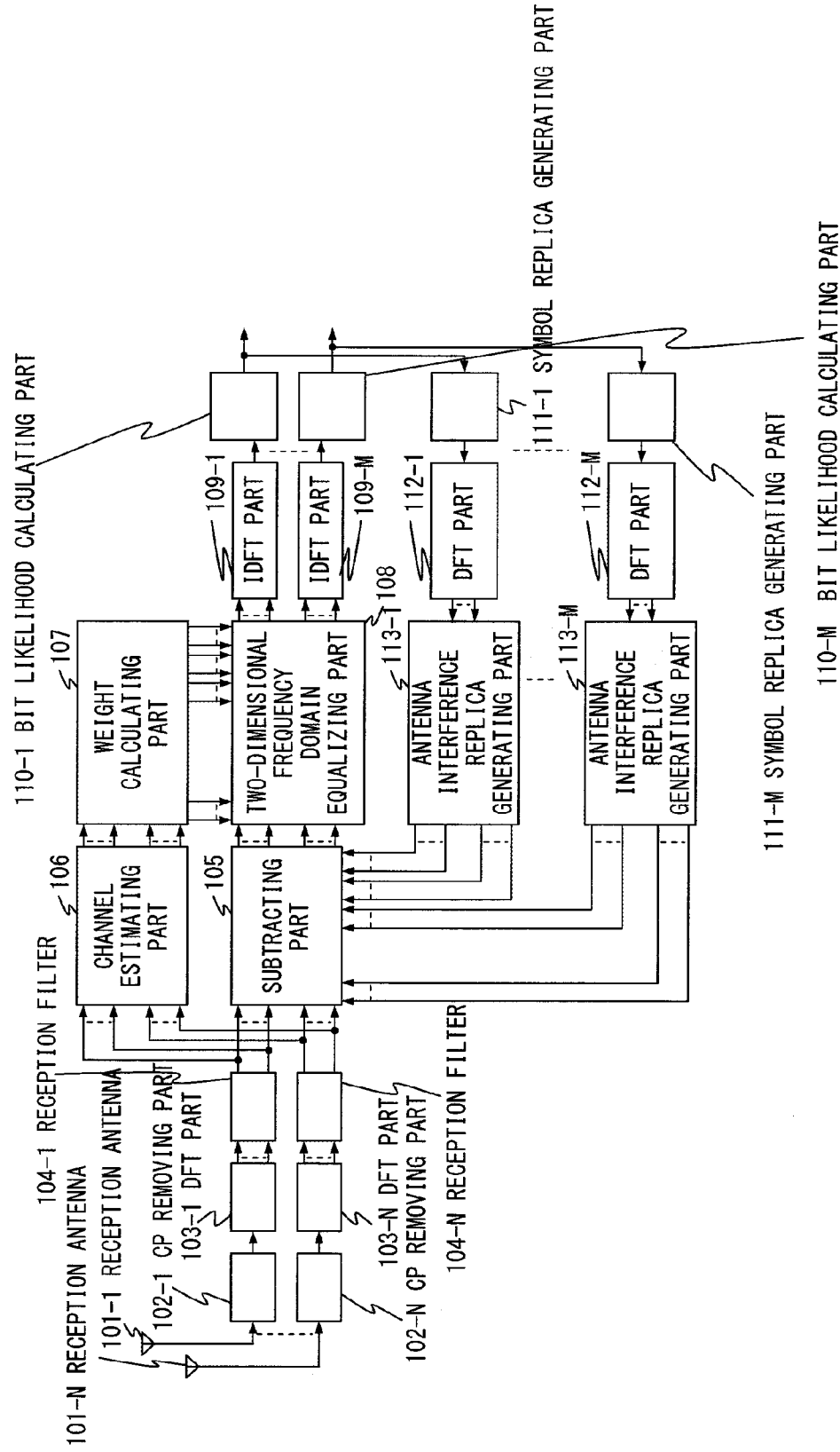
Figure 3:
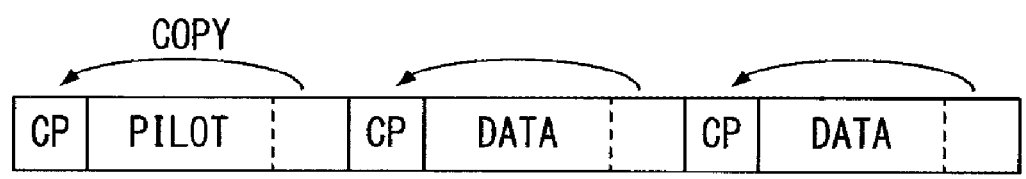
Figure 4:
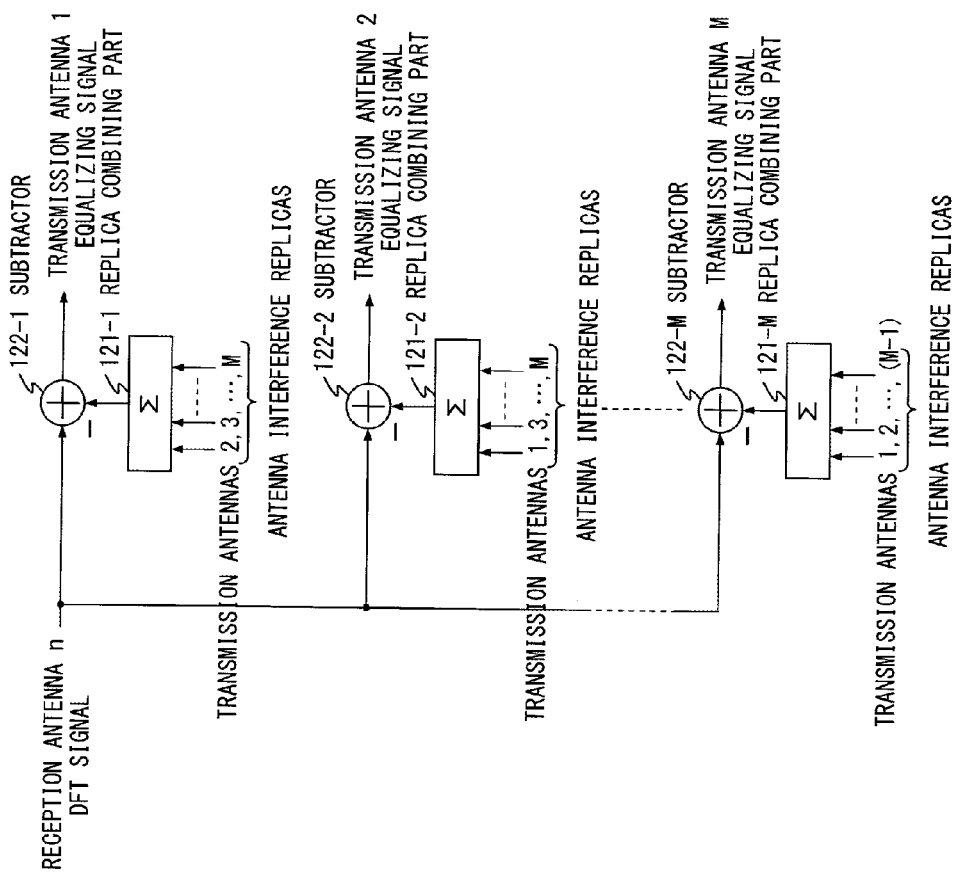
Figure 5:
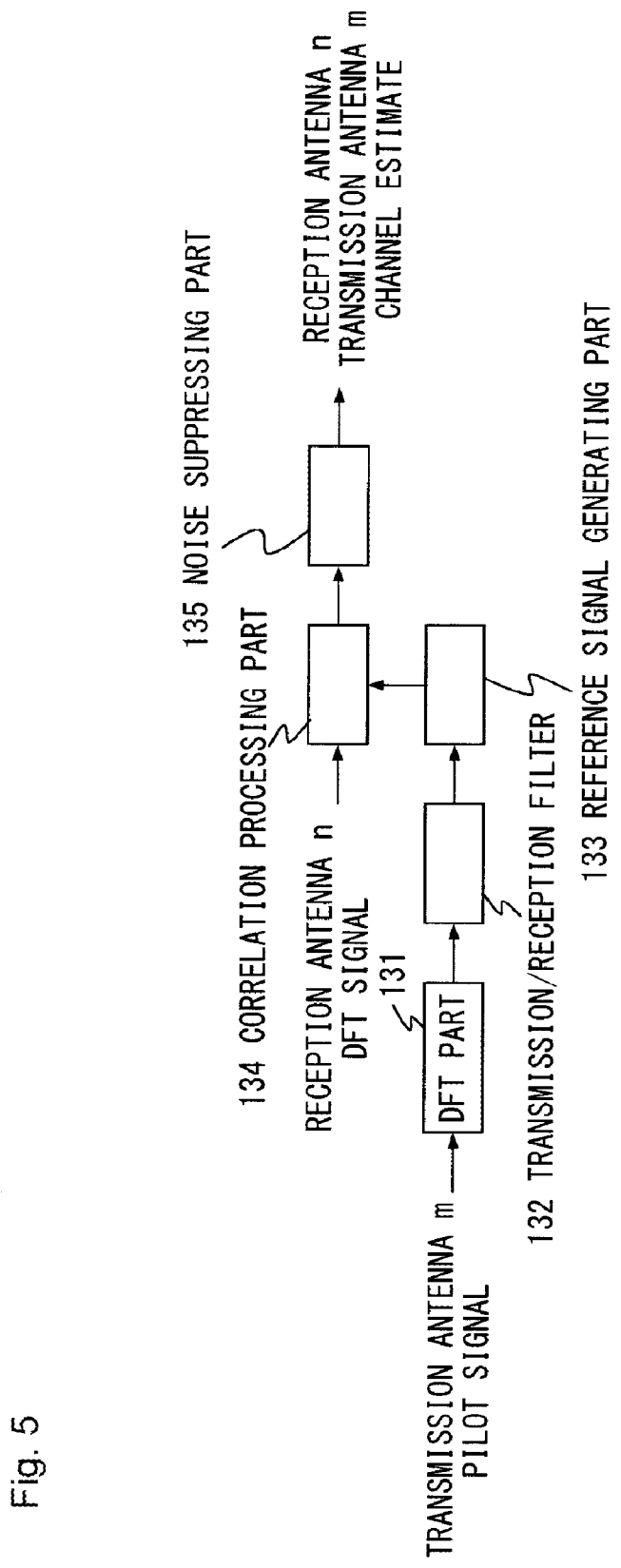
Figure 6:
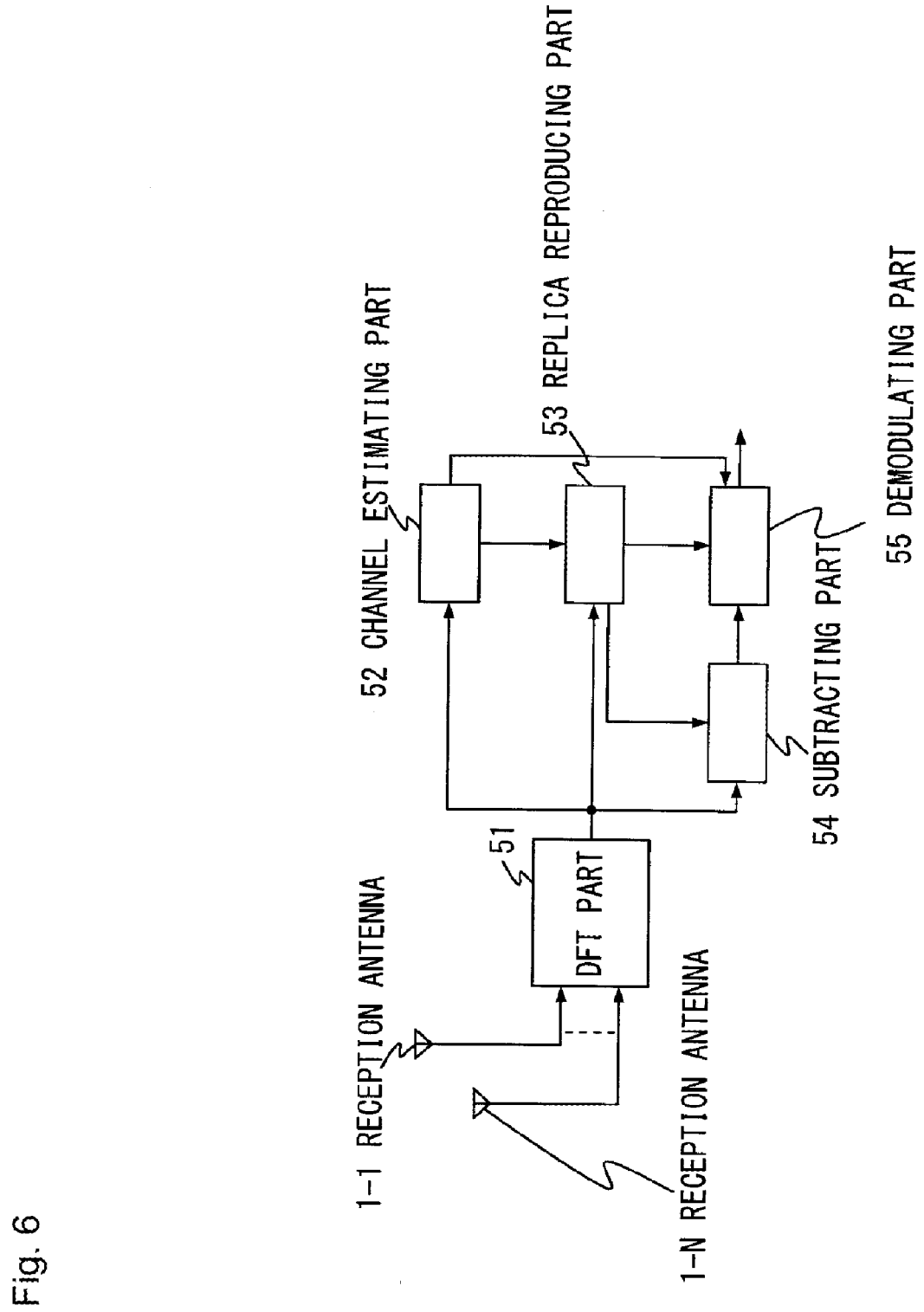
Figure 7:
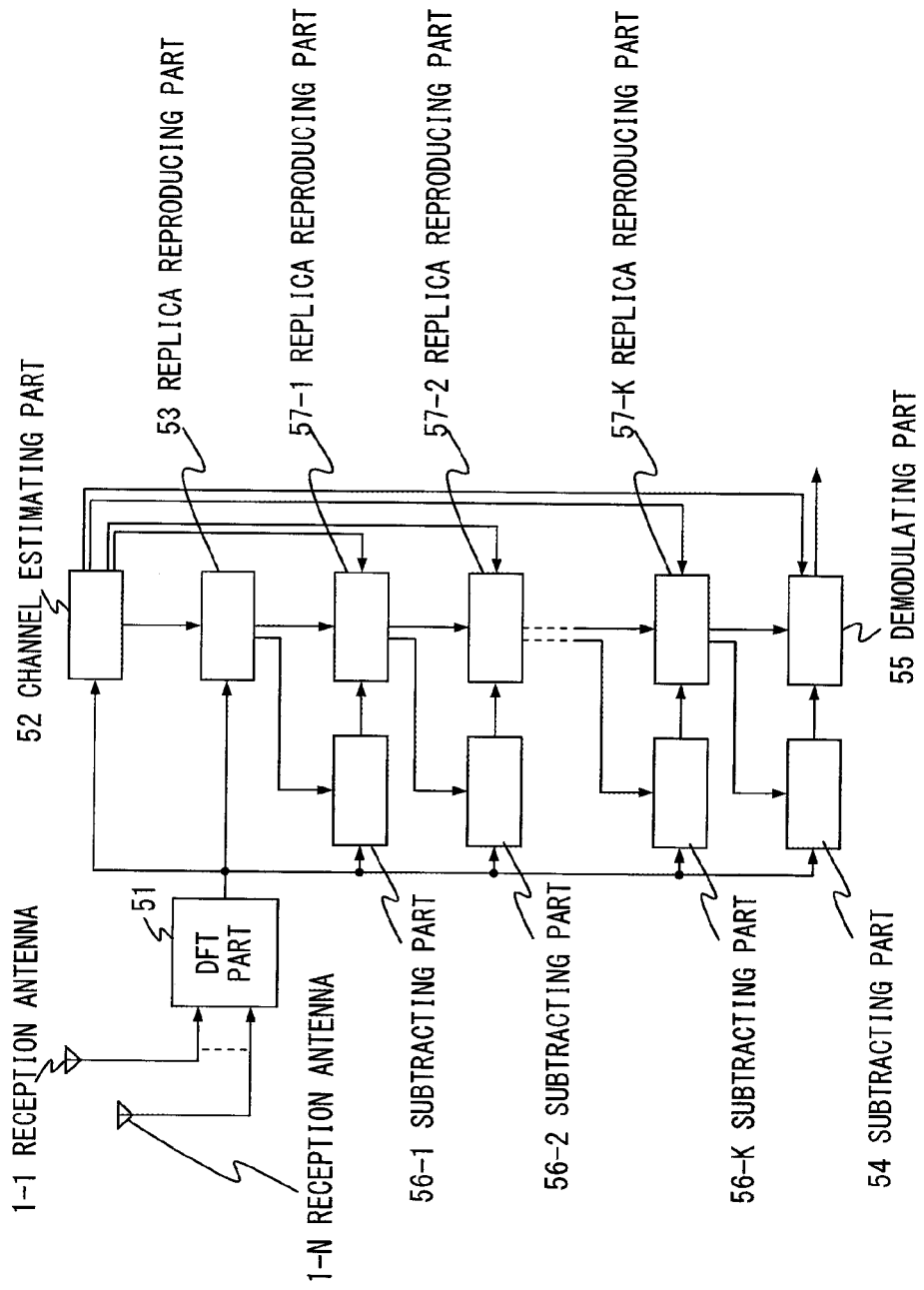

A diagram showing a mode which is a combination of the first embodiment shown in FIG. 6 with the second embodiment shown in FIG. 7.

FIG. 9

A diagram showing the configuration of a subtracting part for a DFT signal of reception antenna n.

BEST MODE FOR CARRYING OUT THE INVENTION

In the following, embodiments of the present invention will be described with reference to the drawings.

FIG. 6 is a diagram showing a first embodiment of a MIMO receiving apparatus of the present invention.

As shown in FIG. 6, the MIMO receiving apparatus in this embodiment is a MIMO receiving apparatus which receives single-carrier MIMO signals transmitted from M transmission antennas (M is an integer equal to or larger than two) at N reception antennas (N is an integer equal to or larger than two), and which separates the MIMO signals through processing in a frequency domain. This MIMO receiving apparatus comprises reception antennas 1-1-1-N, DFT part 51, channel estimating part 52, replica reproducing part 53, subtracting part 54, and demodulating part 55.

DFT part 51 discrete Fourier transforms signals received at reception antennas 1-1-1-N at point:

$$N_{DFT1} (N_{DFT} \text{ is an integer equal to or larger than two}) \quad \text{[Expression 30]}$$

which is a first point. Channel estimating part 52 estimates a channel gain between a transmission antenna and a reception antenna using a pilot signal inserted in a signal transmitted from each transmission antenna. Replica reproducing part 53 performs two-dimensional frequency domain equalization based on a weight calculated using the channel gain, and generates an interference replica which imitates an interference signal of each transmission antenna, and a distortion-free signal replica which imitates a distortion-free signal. Subtracting part 54 eliminates interference replicas of all transmission antennas from a signal output from DFT part 51. Demodulating part 55 performs two-dimensional frequency domain equalization with a weight calculated on the basis of interference removal of subtracting part 54 using the channel gain for signals from which the interference replicas have been eliminated, and adds the distortion-free signal replicas to equalized signals to demodulate each transmission antenna signal.

The MIMO receiving apparatus of this embodiment is configured such that subtracting part 54 eliminates the interference replicas of all transmission antennas, and the distortion-free signal replica is added to each transmission antenna signal after two-dimensional frequency domain equalization by demodulating part 55, thereby making it possible to eliminate not only other antenna interference but also multipath interference of a transmission antenna subjected to demodulation. Accordingly, excellent MIMO reception characteristics can be realized without increasing the amount of processing as compared with before.

FIG. 7 is a diagram showing a second embodiment of a MIMO receiving apparatus of the present invention.

As shown in FIG. 7, the MIMO receiving apparatus in this embodiment comprises subtracting parts 56-1-56-K at K stages (K is an integer equal to or larger than one) and replica reproducing parts 57-1-57-K after replica reproducing part 53 in the first embodiment shown in FIG. 6. The MIMO receiving apparatus shown in FIG. 7 is a MIMO receiving apparatus which receives single-carrier MIMO signals transmitted from M transmission antennas (M is an integer equal to or larger than two) at N reception antennas (N is an integer equal to or larger than two), and which separates the MIMO signals through processing in the frequency domain. This MIMO receiving apparatus comprises reception antennas 1-1-1-N, DFT part 51, channel estimating part 52, replica reproducing part 53, subtracting parts 56-1-56-N, replica reproducing parts 57-1-57-K, subtracting part 54, and demodulating part 55.

DFT part 51 discrete Fourier transforms signals received at reception antennas 1-1-1-N at point:

$N_{DFT1}$ ($N_{DFT1}$ is an integer equal to or larger than two) [Expression 31]

which is a first point. Channel estimating part 52 estimates a channel gain between a transmission antenna and a reception antenna using a pilot signal inserted in a signal transmitted from each transmission antenna. Replica reproducing part 53 performs two-dimensional frequency domain equalization based on a weight calculated using the channel gain, and generates an interference replica and a distortion-free signal replica of each transmission antenna. Subtracting parts 56-1-56-K eliminate interference replicas of all transmission antennas from a signal output from DFT part 51, respectively. Replica reproducing parts 57-1-57-K respectively perform two-dimensional frequency domain equalization with a weight which is calculated taking in to consideration interference removal by subtracting parts 56-1-56-K from the channel gain. Then, replica reproducing parts 57-1-57-K add distortion-free signal replicas to their outputs to demodulate each transmission antenna signal, and generate interference replica and a distortion-free signal replica of each transmission antenna. Subtracting part 54 eliminates interference replicas of all transmission antennas from the signal output from DFT part 51. Demodulating part 55 performs two-dimensional frequency domain equalization with a weight calculated on the basis of interference removal by subtracting part 54 using the channel gain for signals from which the interference replicas have been eliminated, and adds the distortion-free signal replicas to equalized signals to demodulate each transmission antenna signal.

The MIMO receiving apparatus of this embodiment is configured such that subtracting parts 56-1-56-K and subtracting part 54 eliminate the interference replicas of all transmission antennas, and the distortion-free signal replica is added to each transmission antenna signal after two-dimensional frequency domain equalization by replica reproducing parts 57-1-57-K and demodulating part 55. In this way, since the MIMO receiving apparatus can eliminate not only other antenna interference but also multipath interference of a transmission antenna subjected to demodulation, it can realize excellent MIMO reception characteristics without increasing the amount of processing as compared with before. In addition, the MIMO reception characteristics can be further improved by generating highly accurate replicas through repetitions of antenna interference removal and replica reproduction processing.

Next, detailed operations of the MIMO receiving apparatus of the present invention will be described with reference to FIG. 8.

Figure 8:
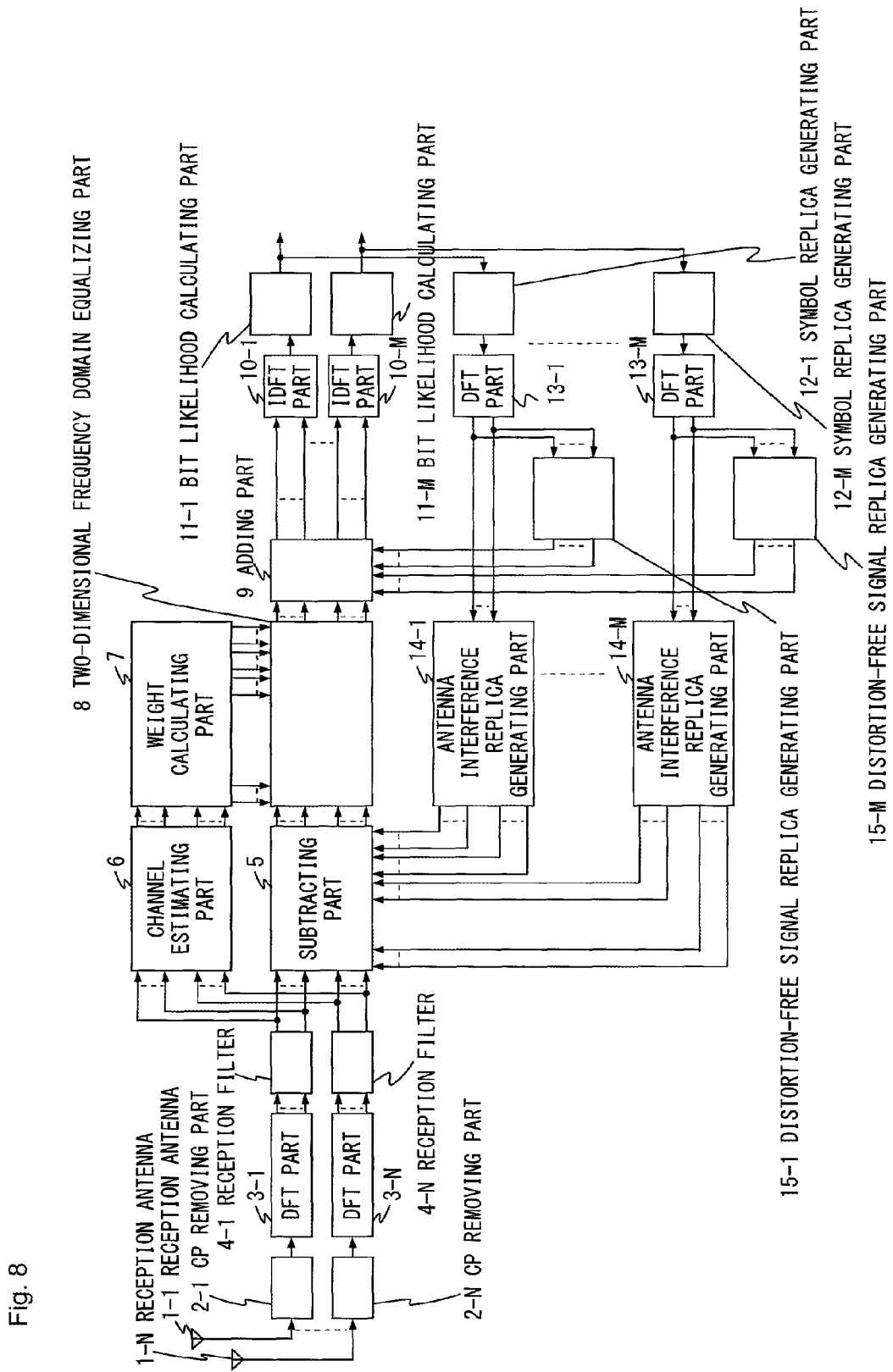

FIG. 8 is a diagram showing a mode which is a combination of the first embodiment shown in FIG. 6 with the second embodiment shown in FIG. 7.

As shown in FIG. 8, the MIMO receiving apparatus of this embodiment comprises reception antennas 1-1-1-N, CP removing parts 2-1-2-N, DFT parts 3-1-3-N, reception filters 4-1-4-N, subtracting part 5, channel estimating part 6, weight calculating part 7, two-dimensional frequency domain equalizing part 8, adding part 9, IDFT parts 10-1-10-M, bit likelihood calculating parts 11-1-11-M, symbol replica generating parts 12-1-12-M, DFT parts 13-1-13-M, antenna interference replica reproducing parts 14-1-14-M, and distortion-free signal replica generating parts 15-1-15-M.

Reception antennas 1-1-1-N receive single-carrier MIMO signals. CP removing part 2-1-2-N is applied with the signal received at each reception antenna 1-1-1-N, and removes part of the signal corresponding to CP at a common timing. DFT part 3-1-3-N receives each reception antenna signal, from which the CP has been removed, and performs DFT at point:

$N_{DFT1}$ ($N_{DFT1}$ is an integer equal to or larger than two) [Expression 32]

which is a first point, to convert the reception signal to the frequency domain. Reception filters 4-1-4-N filter the reception signals in the frequency domain and perform waveform shaping, noise suppression, user separation, and the like. Generally, raised cosine roll-off filters are used for reception filters 4-1-4-N. In the configuration shown in FIG. 8, reception filters 4-1-4-N perform signal processing in the frequency domain, but alternatively can perform signal processing in a time domain prior to DFT parts 3-1-3-N. Subtracting part 5 subtracts all transmission antenna interference replicas, including a transmission antenna signal subjected to demodulation.

Figure 9:
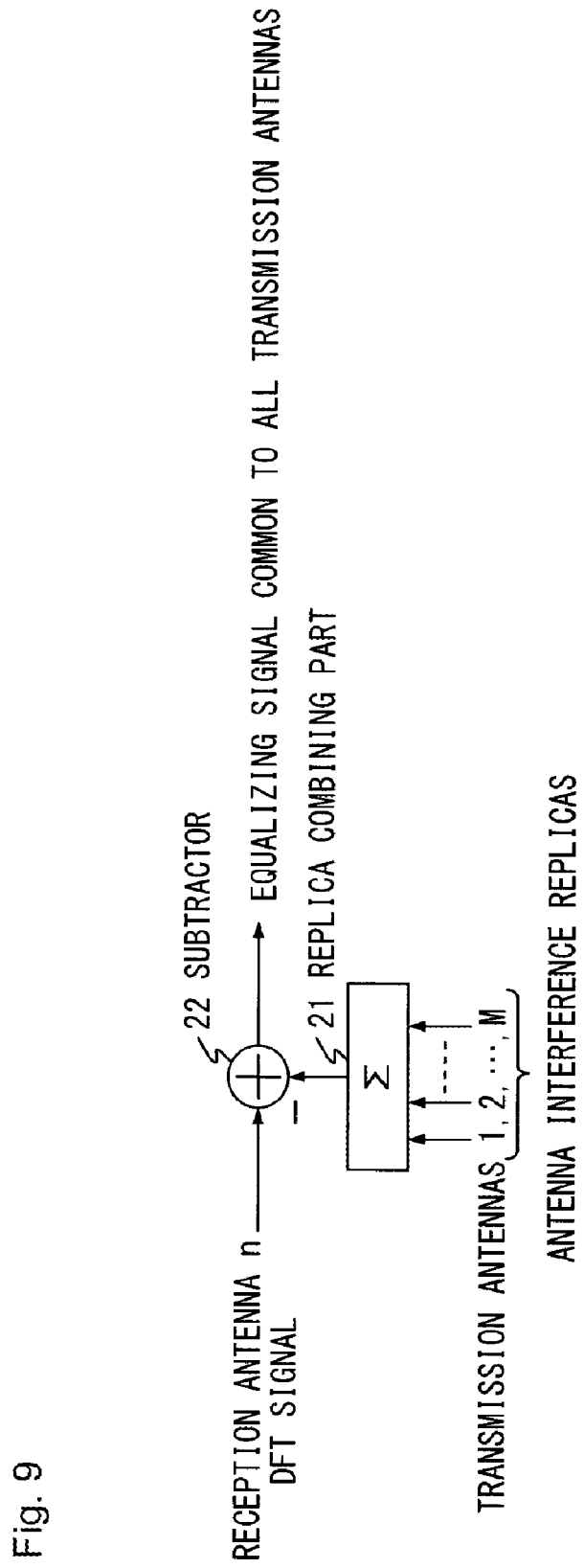

FIG. 9 is a diagram showing an exemplary configuration of subtracting part 5 for a DFT signal of reception antenna n.

Subtracting part 5 shown in FIG. 9 comprises replica combining part 21 and subtractor 22. Replica combining part 21 combines all transmission signal interference replicas. Subtractors 22 subtracts the output of replica combining part 21 from the DFT signal of reception antenna n. Assuming that reception signals at sub-carriers $k (1 \leq k \leq N_{DFT1})$ [Expression 33]

after DFT are given by:

$R(k)$ ($R(k)$ is an $N$-row column vector), [Expression 34]

and i-th repetition interference replica of transmission antenna m is given by:

$\hat{I}_m^{(i)}(k)$ ($\hat{I}_m^{(i)}(k)$ is an $N$-row column vector), [Expression 35]

an equalizing signal for each transmission antenna after removal of the i-th repetition interference:

$R^{(i)}(k)$ ($R^{(i)}(k)$ is an $N$-row column vector), [Expression 36]

is common to all transmission antennas, and given by the following equation:

[Expression 37]

$$R^{(i)}(k) = R(k) - \sum_{m'=1}^{M} \hat{I}_{m'}^{(i)}(k) \qquad \text{(Equation 9)}$$

Here, interference removal is not performed in the first reception processing (zero-th repetition), and a reception signal is used as it is. Specifically,

[Expression 38]

$$R^{(0)}(k)=R(k) \quad \text{(Equation 10)}$$

is established. Since the calculation of antenna interference removal in Equation (9) is common to each transmission antenna, the amount of processing can be reduced as compared with a conventional processing.

Channel estimating part 6 estimates a channel gain between a transmission antenna and a reception antenna in the frequency domain using a pilot signal inserted in a signal transmitted from each transmission antenna. Channel estimating part 6 in this embodiment performs signal processing in the frequency domain, but can also perform signal processing in the time domain prior to DFT parts 3-1-3-N.

Weight calculating part 7 calculates a weight for two-dimensional frequency domain equalization using the channel estimate which is a channel gain between the transmission antenna and the reception antenna in a channel estimating part 6. Generally, an MMSE algorithm is used for weight calculating part 7. An i-th repetition MMSE weight for transmission antenna m:

$$W_m^{(i)}(k) \, (W_m^{(i)}(k) \text{ is an } N\text{-column row vector}) \quad \text{[Expression 39]}$$

is calculated using a channel estimate matrix:

$$\hat{H}(k) \, (\hat{H}(k) \text{ is an } N\text{-row, } M\text{-column matrix}) \quad \text{[Expression 40]}$$

and noise power:

$$\sigma^2 \quad \text{[Equation 41]}$$

by the following equation:

[Expression 42]

$$W_m^{(i)}(k)=\hat{H}_m^{H}(k)[\hat{H}(k)G^{(i)}\hat{H}^H(k)+\sigma^2 I]^{-1} \quad \text{(Equation 11)}$$

where

[Expression 43]

$$\hat{H}(k)=[\hat{H}_1(k),\ldots,\hat{H}_m(k),\ldots,\hat{H}_M(k)] \quad \text{(Equation 12)}$$

Also, $$\hat{H}_m(k) \, (\hat{H}_m(k) \text{ is an } N\text{-row column vector}) \quad \text{[Expression 44]}$$

is a channel estimate between transmission antenna m and reception antenna.

$$G^{(i)} \quad \text{[Equation 45]}$$

is an i-th repetition interference removal consideration matrix, and is common to all transmission antennas, and is given by the following equation:

[Expression 46]

$$G^{(i)}=\text{diag}[g_1^{(i)},\ldots,g_m^{(i)},\ldots,g_M^{(i)}] \quad \text{(Equation 13)}$$

Here, $$g_m^{(i)} \quad \text{[Expression 47]}$$

is calculated using, for example, the average power of an i-th repetition soft decision symbol replica in the time domain of transmission antenna m:

$$\hat{d}_m^{(i)}(t) \quad \text{[Equation 48]}$$

by the following equation:

[Expression 49]

$$g_{m'}^{(i)} = 1 - \frac{1}{N_{SYMB}} \sum_{t=1}^{N_{SYMB}} \left| \hat{d}_{m'}^{(i-1)}(t) \right|^2 \quad \text{(Equation 14)}$$

Here, $$N_{SYMB} \quad \text{[Expression 50]}$$

is the number of symbols in a data block. In the weight calculation by Equation (11), the calculation of inverse matrix [ ]−1 is common to transmission antenna m and has to be performed only once, so that the amount of processing can be reduced as compared with conventional processing.

Two-dimensional frequency domain equalizing part 8 receives the two-dimensional equalization weight calculated in weight calculating part 7 and the output of subtracting part 5, and multiplies them on a sub-carrier by sub-carrier basis to simultaneously perform and output MIMO signal separation and multipath interference suppression in the frequency domain. Assuming that the weight calculated in weight calculating part 7 is given by:

$$W_m^{(i)}(k) \quad \text{[Expression 51]}$$

and the output of subtracting part 5 is given by:

$$R^{(i)}(k) \quad \text{[Expression 52]}$$

an equalization signal of transmission antenna m two-dimensionally equalized in two-dimensional frequency domain equalizing part 8:

$$\tilde{R}_m^{(i)}(k) \quad \text{[Expression 53]}$$

is given by the following equation:

[Expression 54]

$$\tilde{R}_m^{(i)}(k)=W_m^{(i)}(k)R^{(i)}(k) \quad \text{(Equation 15)}$$

Adding part 9 adds a distortion-free signal replica to an equalization signal of each transmission antenna and outputs the resulting sum. Assuming that the distortion-free signal replica of transmission antenna m is given by:

$$\hat{S}_m^{(i)}(k) \quad \text{[Expression 55]}$$

an i-th repetition demodulation signal of transmission antenna m:

$$\tilde{R}'_m^{(i)}(k) \quad \text{[Expression 56]}$$

is given by the following equation:

[Expression 57]

$$\tilde{R}'_m^{(i)}(k)=\tilde{R}_m^{(i)}(k)+\hat{S}_m^{(i)}(k) \quad \text{(Equation 16)}$$

The processing of Equation (16) is not involved in a conventional one and causes an increase in the amount of processing, because this is additional processing for each transmission antenna and requires a smaller amount of processing, even in combination with the subtraction processing of Equation (9), as compared with the conventional subtraction processing.

IDFT part 10-1-10-M receives a demodulated signal of each transmission antenna which is the output of adding part 9, and performs IDFT at point:

[Expression 58]

$N_{IDFT}$ ($N_{IDFT}$ is an integer equal to or larger than two), which is a second point, to convert the modulated signal to the time domain. Outputs of an i-th repetition (i≧1) of IDFT parts 10-1-10-M constitute a final demodulated signal.

Bit likelihood calculating part 11-1-11-M calculates a likelihood for each bit transmitted on the basis of the demodulated signal of each transmission antenna. Bit likelihood calculating parts 11-1-11-M may also include hard decision of bits.

Symbol replica generating part 12-1-12-M generates a symbol replica of transmission antenna m based on the bit likelihood of a bit transmitted from each transmission antenna. Used in symbol replica generating parts 12-1-12-M are a method of generating a hard decision symbol replica, a method of generating a hard decision symbol replica and multiplying it by a predetermined replica weighting coefficient (a constant equal to or less than one), a method of generating a soft decision replica, and the like. Also, in the configuration shown in FIG. 8, the symbol replica is generated from demodulated bits, but since the replica is generated with high accuracy, a demodulating part may be provided after bit likelihood calculating parts 11-1-11-N for performing error correction decoding, where a method may be contemplated to generate a symbol replica using bits after they have been error correction decoded in the decoding part.

DFT part 13-1-13-M receives a symbol replica of each transmission antenna generated in symbol replica generating part 12-1-12-M, and performs DFT at point:

[Expression 59]

$N_{DFT2}$ ($N_{DFT2}$ is an integer equal to or larger than two), which is a third point, to convert the symbol replica to the frequency domain.

Antenna interference replica generating part 14-1-14-M generates a transmission antenna interference replica using a symbol replica signal in the frequency domain of each transmission antenna and a channel estimate. Assuming that a symbol replica signal in the frequency domain of transmission antenna m is given by:

$\hat{D}_m^{(i)}(k)$ [Expression 60]

and the channel estimate is given by:

$\hat{H}_m(k)$ [Expression 61]

an i-th repetition interference replica of transmission antenna m:

$\hat{I}_m^{(i)}(k)$ [Expression 62]

is given by the following equation:

[Expression 63]

$$\hat{I}_m^{(i)}(k) = \hat{H}_m(k)\hat{D}_m^{(i-1)}(k) \quad \text{(Equation 17)}$$

Distortion-free signal replica generating part 15-1-15-M generates a distortion-free signal replica using a symbol replica signal in the frequency domain of each transmission antenna and a sub-carrier average value of the channel gain after two-dimensional frequency domain equalization. Assuming that the symbol replica signal in the frequency domain of transmission antenna m is given by:

$\hat{D}_m^{(i)}(k)$ [Expression 64]

and the sub-carrier average value of the channel gain after equalization is given by:

$\hat{H}'^{(i)}_m$ [Expression 65]

an i-th repetition distortion-free signal replica of transmission antenna m:

$\hat{S}_m^{(i)}(k)$ [Expression 66]

is given by the following equation:

[Expression 67]

$$\hat{S}_m^{(i)}(k) = \hat{H}'^{(i)}_m \hat{D}_m^{(i-1)}(k) \quad \text{(Equation 18)}$$

where

[Expression 68]

$$\hat{H}'^{(i)}_m = \frac{1}{N_{DFT1}} \sum_{k=1}^{N_{DFT1}} W_m^{(i)}(k)\hat{H}_m(k) \quad \text{(Equation 19)}$$

In the first embodiment and second embodiment described above, in each repetitive processing operation for antenna interference removal and replica reproduction, each transmission antenna signal is simultaneously demodulated, and antenna interference replicas are eliminated in parallel. A method is also contemplated to order transmission antenna signals in each repetitive processing operation based on a reception quality to, demodulate transmission antenna signals with higher qualities, and sequentially to eliminate antenna interference. Specifically, in first (zero-th repetition) reception processing, transmission antenna signals with higher reception qualities are demodulated in order and interference replica is eliminated from DFT signals. In reception processing in an i-th repetition ($i \geq 1$), the difference between a current interference replica and the preceding interference replica is eliminated in the sequence of transmission antenna signal that have higher reception qualities from reception signals in which transmission antenna interference in all previous repetitions has been eliminated from the DFT signal. In this event, while the reception characteristics for the number of repetitions are improved by the effect of the sequential interference removal of transmission antenna signals, the amount of processing increases due to the requirements for antenna interference removal and the weight calculation for two-dimensional frequency domain equalization for each transmission antenna.

In this embodiment, conversion from a time domain signal to a frequency domain signal is performed by DFT, while conversion from a frequency domain signal to a temporal domain signal is performed by IDFT, but fast Fourier transform (FFT), inverse fast Fourier transform (IFFT), or another algorithm may be used.

The invention claimed is:

1. A MIMO receiving apparatus for receiving single-carrier signals transmitted from a plurality of transmission antennas at a plurality of reception antennas and separating the signals by a frequency domain, said MIMO receiving apparatus comprising:

a DFT part for discrete Fourier transforming the signals received at the reception antennas;

a channel estimating part for estimating a channel gain between the plurality of transmission antennas and the plurality of reception antennas using a pilot signal inserted into a signal transmitted from each transmission antenna;

a replica reproducing part i) for calculating a weight using the estimated channel gain, ii) for performing two-dimensional frequency domain equalization, based on the weight calculated using the estimated channel gain, to the signals discrete Fourier transformed in said DFT part, and iii) for generating an interference replica and a distortion-free signal replica of each transmission antenna based on the equalized signal;

a subtracting part for removing the interference replicas of all the transmission antennas from the signals discrete Fourier transformed in said DFT part; and a demodulating part i) for calculating a weight using the channel gain for the signals from which the interference replicas are removed, ii) for performing two-dimensional frequency domain equalization to the signals from which the interference replicas are removed, based on the calculated weight using the channel gain for the signals from which the interference replicas are removed, and iii) for adding the distortion-free signal replicas to the equalized signal in the demodulating part to demodulate the signals transmitted from the transmission antennas.

2. The MIMO receiving apparatus according to claim 1, further comprising a plurality of said subtracting part and a plurality of said replica reproducing part for repeatedly performing antenna interference removal and replica reproduction processing, the plural subtracting parts and replica reproducing parts located after the channel estimating part and before the demodulating part.

3. The MIMO receiving apparatus according to claim 1, characterized by simultaneously demodulating transmission antenna signals to eliminate antenna interference in parallel.

4. The MIMO receiving apparatus according to claim 3, further comprising a plurality of said subtracting part and a plurality of said replica reproducing part for repeatedly performing antenna interference removal and replica reproduction processing, the plural subtracting parts and replica reproducing parts located after the channel estimating part and before the demodulating part.

5. The MIMO receiving apparatus according to claim 1, characterized by ordering transmission antenna signals based on a reception quality, demodulating the transmission antenna signals with higher qualities, and sequentially removing the antenna interference.

6. The MIMO receiving apparatus according to claim 5, further comprising a plurality of said subtracting part and a plurality of said replica reproducing part for repeatedly performing antenna interference removal and replica reproduction processing, the plural subtracting parts and replica reproducing parts located after the channel estimating part and before the demodulating part.

* * * * *